(No Model.) 2 Sheets—Sheet 1.
W. H. KING.
SUPPORT FOR BICYCLES.
No. 439,879. Patented Nov. 4, 1890.
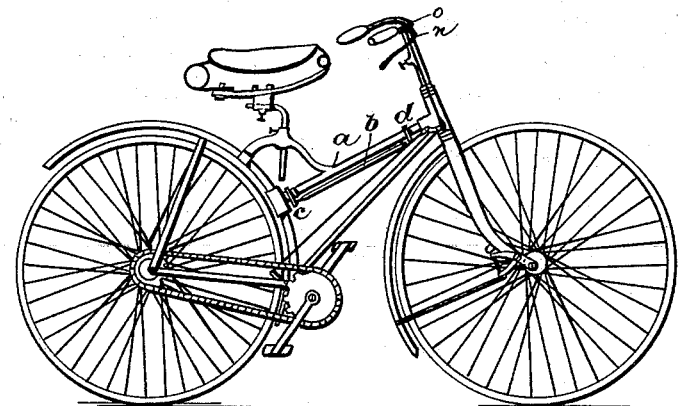
*Fig. 1*
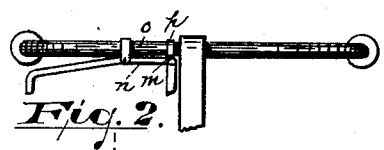 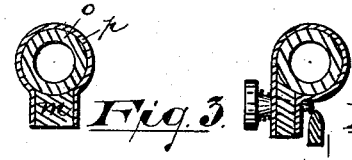 
*Fig. 2.* *Fig. 3.* *Fig. 4.*
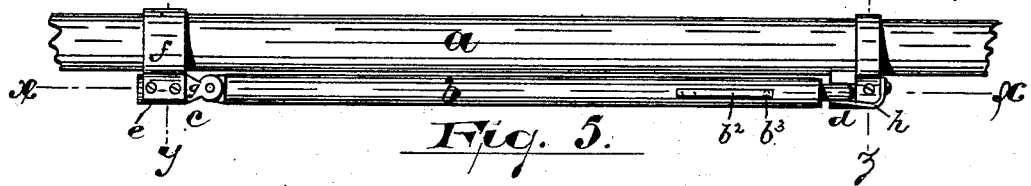
*Fig. 5.*
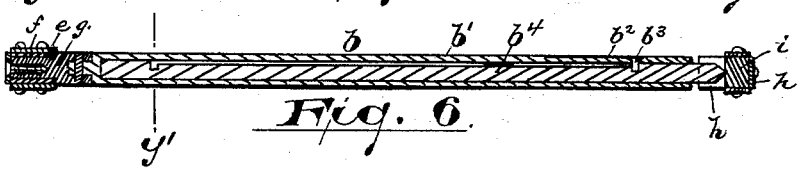
*Fig. 6.*
  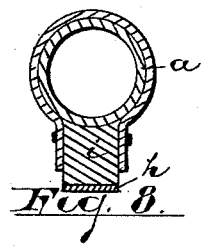
*Fig. 7.* *Fig. 9.* *Fig. 8.*
Witnesses: Oscar A. Michel. James Wayland
Inventor: William H. King,
By Drake & Co., Atty's.

(No Model.) 2 Sheets—Sheet 2.

W. H. KING.
SUPPORT FOR BICYCLES.

No. 439,879. Patented Nov. 4, 1890.

Witnesses
Oscar A. Michel
Chas. R. Michel

Inventor:
William H. King,
By Drake & Co., Atty's.

UNITED STATES PATENT OFFICE.

WILLIAM H. KING, OF NEWARK, NEW JERSEY.

SUPPORT FOR BICYCLES.

SPECIFICATION forming part of Letters Patent No. 439,879, dated November 4, 1890.

Application filed July 7, 1890. Serial No. 358,027. (No model.)

*To all whom it may concern:*

Be it known that I, WILLIAM H. KING, a citizen of the United States, residing at Newark, in the county of Essex and State of New Jersey, have invented certain new and useful Improvements in Bicycles and Supports for the Same; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to enable bicycle-riders to temporarily station their vehicles in upright positions with greater convenience while on the road. Heretofore it has been the practice of riders when stopping for a moment for business or other purposes to rest the vehicle against a post, tree, or other standing support, if one could be found, or in the absence of such a support to lay the vehicle on the ground. The finding of a suitable support or place to lay the vehicle has been the occasion of considerable trouble and inconvenience, and the practice has resulted in damage to the plated or otherwise finished surfaces engaged by the support. In the use of my improved devices a convenient and suitable support is always at hand.

The invention consists in the improved bicycle, and in the arrangements and combinations of parts, substantially as will be hereinafter set forth, and finally embodied in the clauses of the claims.

Figure 10:
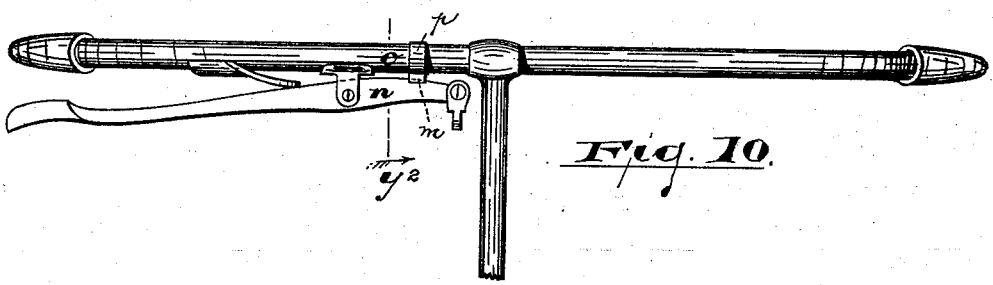
Figure 11:
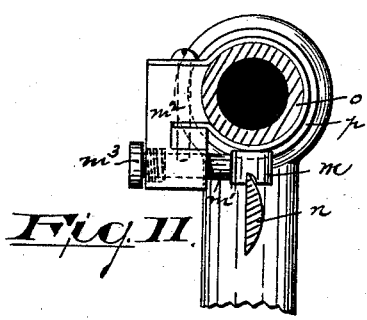
Figure 12:
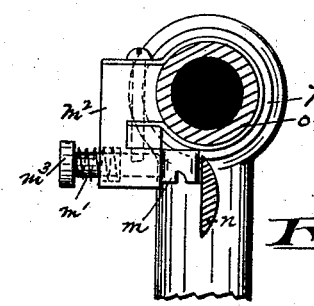
Figure 13:
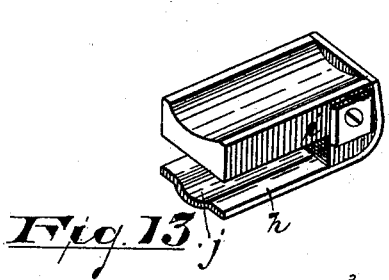
Figure 14:
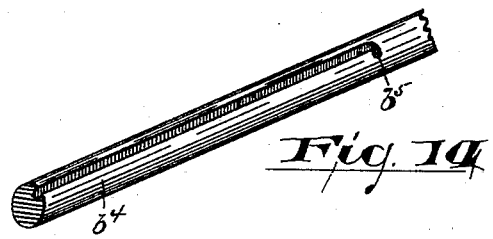
Figure 15:
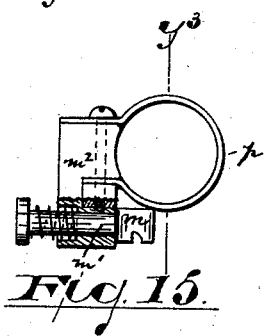
Figure 16:

Referring to the accompanying drawings, in which like letters indicate corresponding parts in each of the several figures of the two sheets, Figure 1 is a side elevation of the improved vehicle. Fig. 2 is a detail showing a handle-bar and brake-lever, and a device adapted to hold the brake in engagement with the wheel. Figs. 3 and 4 are sections illustrating modified constructions of the said holding device. Fig. 5 is a detail of a part of the frame of the vehicle, having a support secured thereon. Fig. 6 is a longitudinal section of the same, taken on line $x$, Fig. 5. Figs. 7 and 8 are sectional details taken, respectively, through lines $y$ and $z$, Fig. 5, and showing more fully the means for holding the brace or support in place on the frame. Fig. 9 is a section of the inner bar of the brace, taken on line $y'$. Fig. 10 is an enlarged front view of the handle-bar and brake-lever and means for holding the latter, showing a preferred construction. Figs. 11 and 12 are sections of the same, taken on line $y^2$, and showing the holding device in operative and inoperative relations to the said lever. Fig. 13 is a detail of a certain spring-catch; Fig. 14, a detail of the inner section of the brace; Fig. 15, a detail, partly in section, of the brake-holder; and Fig. 16, a section of the same on line $y^3$.

In said drawings, $a$ indicates the upper of two connecting bars or portions of the vehicle-frame, which in the "Safety" type of machines connects the front fork with the rear portions of the frame.

$b$ indicates a brace or support which is carried by the frame, and is so arranged thereon that it can be readily detached and made to serve as a standard or leg, against which the machine may rest when standing. The said support or brace is preferably hinged or permanently attached by a compound joint to the frame at or near its junction with a vertically-extending fork, as at $c$, at one end, and at the other is caught by a suitable lock or catch $d$, the said bearings $c$ and $d$ being of any desirable construction, but by preference of the kind shown more clearly in Figs. 5, 6, 7, 8, and 13, in which $e$ indicates a block strapped by a band $f$, or otherwise secured to the frame $a$, and perforated, as indicated in Fig. 7, to receive a swivel $g$. The swivel $g$ is suitably secured in said block, but is allowed to move freely therein, and to the outer end thereof is hinged or pivoted the support or brace $b$, as indicated in Figs. 5 and 6. The hinge and swivel allow the brace or support to be turned in any direction with relation to the frame $a$ after being released from the catch or lock $d$, and thus it may at its free end be dropped into engagement with the ground and serve to brace or support the vehicle and hold it erect or slightly inclined without extraneous supports. From its hinged or jointed connection with the forward end of the straight portion $a$ the telescoped brace extends parallel with said portion and beneath the same, so as to be protected from accidental downward bearing on said portion $a$, or downward movement of the limbs or other parts or things adjacent to said portion $a$ and nearly horizontally backward to a catch or lock, in which the end of the section is caught and held and hidden, so that there will be no projection of said brace beyond said catch on which the clothing, &c., of the rider may be caught.

The lock or catch for holding the free end of the brace or support consists, preferably, of a spring-tongue $h$, Figs. 5, 6, 8, and 13, carried by a block $i$, strapped or otherwise secured to the frame $a$. Said tongue may be bent, as at $j$ in Fig. 13, to receive and hold the end of the brace in fixed relation to the frame or the block $i$, secured thereto.

The preferred mode of bending the spring whereby it will protect the end of the telescoped brace is shown in Fig. 13, in which the flat strap-like spring is turned around the block and extends a limited distance longitudinally parallel with the portion $a$ or the block $i$, secured thereto, the bent portion $j$ forming the longitudinal recess for the brace, having openings at opposite sides thereof through which the brace may be forced in either direction, so that said brace may with direct movement be forced outward and used on either side of the vehicle, as will be understood.

The brace or bar-like support may be a single unjointed piece; but to obtain compactness I prefer to make the support or brace $b$ in jointed sections, which may be folded together and arranged within the limited space provided by the upper connecting-bar. By connecting with the upper connecting-bar I am enabled to grasp the brace while seated on the saddle and manipulate the same with much greater ease and convenience than if it were on the lower of the bars. By this arrangement, also, the brace when reduced to the size of the bar may be disposed more nearly at a horizontal position, and the sections are thus less liable to become detached from one another and to drop to the ground. When folded, the brace is reduced in size to be substantially equal in length to the upper connecting-bar, so as not to project beyond the same, and thus present an unsightly appearance and serve as a catch for garments, &c. On the contrary, the reduced support when fastened, lies or is arranged beneath the bar $a$ on the vertical center plane of said bar, where it is protected and cannot occupy room between the legs of the rider, as will be understood.

When arranged telescopically, as shown, the outer hollow section $b'$ is provided with a spring $b^2$, which is furnished at one end with a pin or lug $b^3$, that extends through a hole or opening in said outer section into frictional engagement with the inner section $b^4$, and thus the said inner section is prevented from moving too freely in the hollow section. The lug $b^3$ also acts to limit the movement of the inner section by working in a groove or recess similar to those employed ordinarily in fastening bayonets in position. Thus by drawing the inner section out from the hollow or tubular section until stopped by the limiting pin or lug $b^3$ and turning the same in its bearings, so that the said lug enters a lateral groove or recess $b^5$, the said bar $b^4$ will be held from return movement, and the elongated support will serve the purpose to better advantage, as will be understood.

In operating the brace or support when the same is made in accordance with the preferred construction the free end thereof is drawn or forced out from the spring-catch $h$ by lateral pressure or otherwise and the inner section $b^4$ drawn from the tube $b'$ and fastened, as described. The free end is then simply dropped onto the ground and the vehicle inclined slightly to lean against the support, the two wheels acting, in conjunction with the support or brace, to hold the vehicle in an upright position.

When the vehicle is to stand on an inclined surface, I find it desirable to prevent the vehicle from gravitating and dragging or carrying the support forward at the top, so that it will no longer serve its purpose. This result I accomplish by providing a brake-holder or a device adapted to hold the brake mechanisms in frictional contact with one of the wheels of the vehicle. Thus the wheel will be prevented from turning or rolling down the incline automatically. I may employ the brake-holder independent of the support or bracing devices for the purpose of preventing the machine from running off when unguarded by the rider; but I find it particularly valuable when employed in co-operation with the brace.

The brake-holder may be a simple block $m$, adapted to be interposed between the brake-lever $n$ and the handle-bar $o$, the block being fastened to the said handle-bar by the strap $p$, but free to slide toward and from the fulcrum of the lever, as will be understood upon reference to Figs. 1 and 3; but the brake-holder I prefer to employ is the automatic device shown in Figs. 10, 11, 12, 15, and 16, in which the holding-block $m$, adapted to hold the lever away from the handle, so that the brake will be forced into contact with the vehicle-wheel in the usual way, is arranged on a spring-actuated plunger $m'$, arranged in bearings $m^2$, secured by the strap $p$ to the handle-bar $o$, so that when the lever is separated from the handle-bar the said block may be forced by the hand into its effective position. The block $m$ will spring from between the handle-bar and lever automatically on the lever being turned by hand in Fig. 11. By pulling on the finger-piece the block $m$ may be withdrawn from between the lever and bar, and the former will be thrown from braking engagement by the usual spring.

Having thus described the invention, what I claim as new is—

1. In a bicycle, the combination, with the brake-lever $n$ and handle-bar $o$, of a block $m$, carried by a plunger $m'$, having a finger-piece $m^3$, substantially as and for the purposes set forth.

2. In a bicycle, the combination, with a brake-lever and handle-bar, of a spring-actuated plunger adapted to be inserted between the said handle-bar and brake-lever to hold the same apart, substantially as and for the purposes set forth.

3. In a bicycle, the combination, with the handle-bar, of a bearing $m^2$, secured to said bar, a block $m$, spring-actuated plunger $m'$, carrying said block and arranged in said bearings, and a finger-piece $m^3$, all arranged and combined substantially as set forth.

4. The improved velocipede brace or support herein described, combining, with means for fastening the brace to the vehicle, an outer tubular section provided with a spring $b^2$, furnished with a pin or lug $b^3$, which extends through a hole or opening in said section into frictional engagement with the inner section $b^4$, and said inner section provided with a longitudinal groove and at the ends with lateral recesses $b^5$, substantially as set forth.

5. The improved bicycle of the Safety type herein shown, having upper and lower connecting-bars which join the front fork to the rear portions of the frame, the combination, with the short upper connecting portion $a$, of a longer telescopic support or brace connected with said bar at its junction with the front fork and adapted to engage the ground when distended, and to be reduced to a length substantially equal to said connecting portion, and a catch for holding the same to said bar $a$, substantially as set forth.

6. In a support for velocipedes, substantially as described, the combination, with the brace-sections, of a block $e$ and band $f$, securing said block to the frame of the vehicle and perforated to receive a swivel, said swivel $g$ having one end arranged in said block and the other having the bracing-section hinged thereto, substantially as and for the purposes set forth.

7. The combination, with the bicycle connecting-bar $a$, uniting the front fork with the rear of the frame, of a brace arranged centrally beneath said bar, and a catch, substantially as set forth.

8. The combination, with the straight portion $a$ of a velocipede, connecting the front fork with the rear part of the frame, of a telescopic support or brace hinged at one end of said portion $a$, and at the end caught by a catch or lock, the said catch covering the extremity of said support or brace, substantially as and for the purposes set forth.

9. The combination, with the straight connecting portion $a$, of the frame, a support or brace hinged at one end and at the other caught by a covering-spring, by which the end of the support or brace is hidden or guarded, substantially as set forth.

10. In combination with the upper of the two connecting-bars of a bicycle of the Safety type, a sectional support adapted to be reduced to the size of said upper bar, and a catch for holding the same in place, substantially as set forth.

11. In combination with the block $i$, connected with the frame portion, a spring $h$, bent, as at $j$, and having laterally and oppositely adjacent thereto openings through which the brace may be forced in opposite directions, substantially as set forth.

12. In combination with the connecting part $a$, having a brace secured thereto, of a catch consisting of a spring extending parallel with said connecting part $a$, the opposite sides of said spring being open to allow the brace to be forced in either direction, substantially as set forth.

13. In a bicycle, the combination, with the connecting-bar $a$, of a brace or support hinged on said connecting-bar and movable from either side of the vehicle, whereby the said vehicle may be inclined and held in either direction.

14. In a bicycle, the combination, with the connecting-bar $a$, of a brace arranged centrally beneath said bar and movable to either side of said vehicle, substantially as set forth.

15. In a bicycle, the combination, with the connecting-bar $a$, of a telescopic brace hinged by a compound hinge to said bar and movable from either side of the bicycle, substantially as set forth.

In testimony that I claim the foregoing I have hereunto set my hand this 1st day of July, 1890.

WILLIAM H. KING.

Witnesses:
CHARLES H. PELL,
OSCAR A. MICHEL.